United States Patent Office 3,725,127
Patented Apr. 3, 1973

3,725,127
METHOD AND SYSTEM FOR CONTROLLING A CRYSTALLIZATION INSTALLATION
Roger Retali, Saint Cloud, Francis Dambrine, Marcq en Baroeul, Jean Claude Giorgi, Courbevoie, and Georges Windal, Roubaix, France, assignors to Societe Fives Lille-Cail, Paris, France
Filed Mar. 16, 1971, Ser. No. 124,731
Claims priority, application France, Mar. 19, 1970, 9,797
Int. Cl. B01d 1/00, 9/02
U.S. Cl. 127—16                                    15 Claims

ABSTRACT OF THE DISCLOSURE

Sugar is crystallized out of sugar juice by passing the juice through a succession of steam-heated crystallization cells. Diluted sugar juice is supplied to the intermediate and last cells. The input of the dilute sugar juice supplied to the last cell is controlled to maintain a constant concentration of the crystallized sugar in the last cell, and the total input of the dilute sugar juice introduced into the intermediate cells is maintained at a control value which is a function of the heating vapor consumed in the cells and the concentration of the dilute sugar juice entering the installation whereby the concentration of the crystallized sugar removed from the last cell is determined.

---

Figure 1:
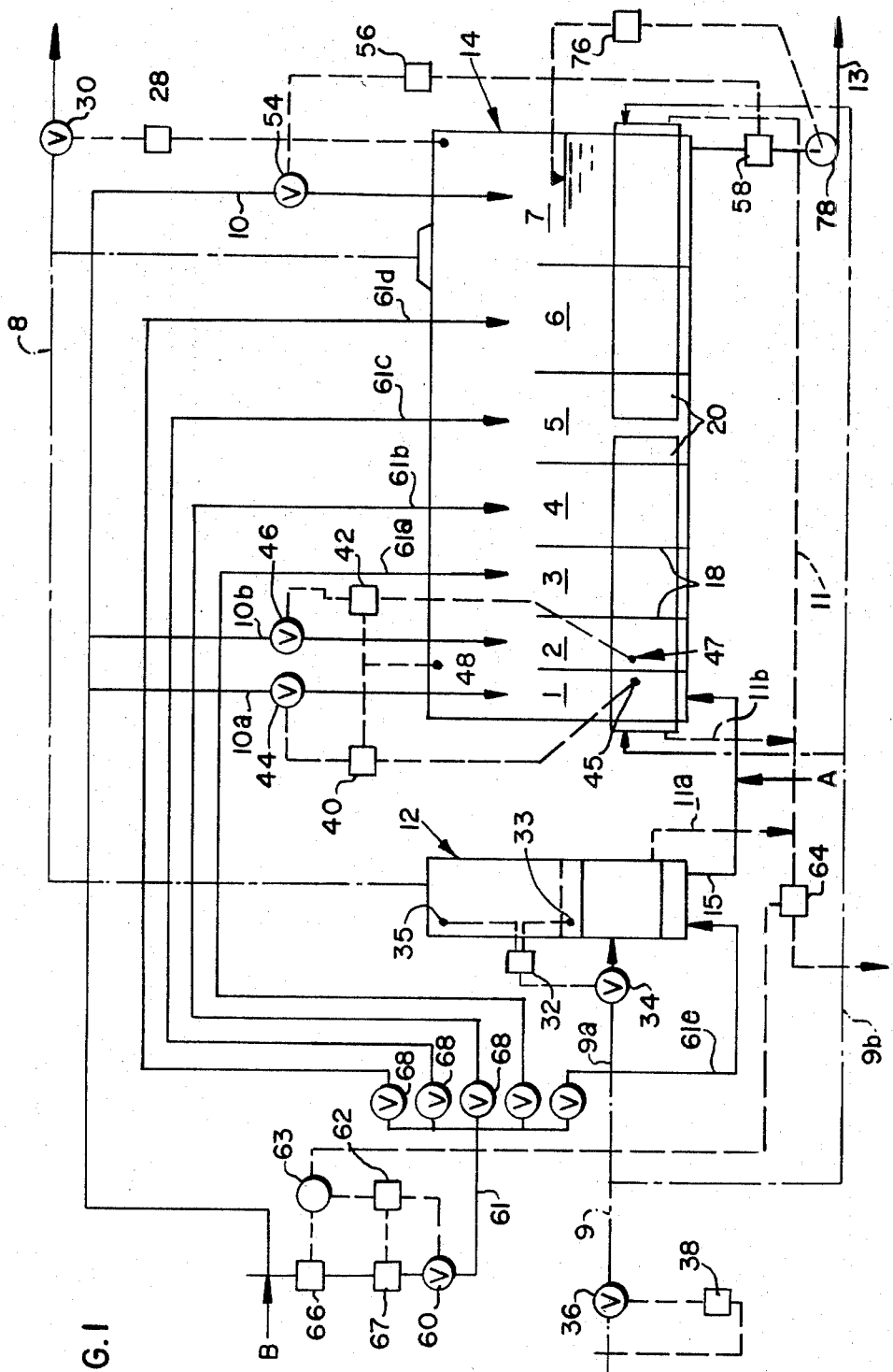

The present invention relates to improvements in installations for crystallizing the solute from a solution thereof in a liquid solvent, such as sugar from sugar juice, by evaporating the liquid solvent in a continuous operation, and more particularly to an improved control for such installations.

In sugar refineries, for instance, installations for producing sugar crystals from sugar juice include a plurality of successive crystallization cells interconnected for passing the sugar juice to be crystallized successively from a first cell through intermediate cells and then into a last cell. An inlet conduit supplies the juice to the first cell, the juice having been concentrated in a concentrating vessel upstream of the first cell, and an outlet pipe removes the crystallized product from the last cell. Steam heated radiators are arranged in the concentrating vessel and in the cells for heating the same and thus to evaporate liquid in the vessel and the cells, steam being delivered to the radiators to provide the desired degree of heat for control of the evaporation.

To improve the crystallization conditions, i.e. to increase the percentage of solute crystallized out of the solution and to obtain regular and sufficiently large crystals, it is necessary to control the saturation of the massecuite during crystallization, for which purpose it has been proposed to suply to each cell and to the concentrating vessel, if desired, an undersaturated solution of the solute whose input is controlled in response to, and as a function of, variations in certain parameters of the solution to be crystallized, such as the boiling temperature of this solution, its concentration, the percentage of crystals therein, etc. For instance, metered amounts of the undersaturated or dilute solution have been supplied to each cell in response to the selected controlling parameters in each cell. This requires a great number of controls and thus increases the cost of the installation.

In U.S. application Ser. No. 19,069, filed Mar. 12, 1970, now Pat. No. 3,680,621; in which two of the joint inventors herein are the inventors and which is commonly assigned, a control system is proposed which comprises a first control for regulating the feed rate of the undersaturated solution to the last cell as a function of the percentage of crystals or solute in the crystallized product removed from the last cell, and a second control regulating the feed rate of the undersaturated solution to the intermediate cells as a function of the feed rate of undersaturated solution to the last cell. This control system is rather complex.

It is the primary object of this invention to simplify crystallization controls in installations of the indicated type. This simplification is based on the fact that the difference beween the concentrations of the products entering and leaving the installation is due solely to the evaporation of the solvent liquid in the installation. Therefore, knowing the concentration of the solution to be crystallized when it enters the installation and the amount of evaporated solvent liquid, it is possible to calculate or compute a theoretical control value of the product input necessary to obtain a given concentration of the product output of the installation. If the input is maintained equal to this control value, the desired concentration should be obtained at the output. In practice, however, this control value will not suffice to obtain the desired value of concentration at the output because the equation used for computation is only approximate, the control devices operate with a time lag which is not negligible, and supposedly constant values often change during actual operations, such as the pressure in the cells, the throughput of vapor in the radiators, etc. Therefore, according to the invention, the supply of undersaturated solution to the last cell is controlled in response to the percentage of crystals or the concentration of the removed product.

Thus, the present invention proposes to control the input of the undersaturated solution supplied to the last cell so as to maintain a constant concentration of the cyrstallized solute in the last cell, and to maintain the total input of the undersaturated solution supplied to the intermediate cells at a control value which is a function of the supersaturation of the solution in these cells.
and the concentration of the undersaturated solution entering the installation whereby the concentration of the crystallized solute removed from the last cell is determined.

It is possible to control either the total input to all cells, except the last one, and, if desired, also that to the concentrating vessel positioned upstream of the first cell, or solely the input to the intermediate cells. In the latter case, the input to the first and, if desired, immediately successive cells is controlled conventionally as a function of the supersaturation of the solution in these cells.

For calculating or computing the control value of the total input of the undersaturated solution, the total amount of condensed water in the radiators in the cells and, possibly, in the concentrating vessel, which is equal to the amount of heating vapor, may be used.

Generally, the amount of heating vapor consumed in the installation is maintained constant. It is also possible to maintain the concentration of the undersaturated solution constant, either by means of a suitably controlled pre-evaporator, or by admixing thereto a solution of juice of different concentration.

The input of concentrated solution supplied to the first cell from the concentrating vessel is maintained approximately proportional to the input of the consumed vapor.

The control system of this invention comprises a first control means for controlling the supply of the undersaturated solution to the last cell in response to the concentration of the crystallized solute removed from the last cell; a first measuring means for measuring the concentration of the undersaturated solution supplied to the cells and producing a first measurement signal; and a second measuring means for measuring the total amount of water condensed in the radiator means at least in the cells and producing a second measurement signal. A computer means receives the measurement signals and produces a control signal which is a function of the measurement signals, the control signal controlling the means for supplying the undersaturated solution to the intermediate cells. A second control means controls the total supply of the undersaturated solution in response to the control signal to maintain the total supply equal to the value determined by the control signal.

Figure 2:
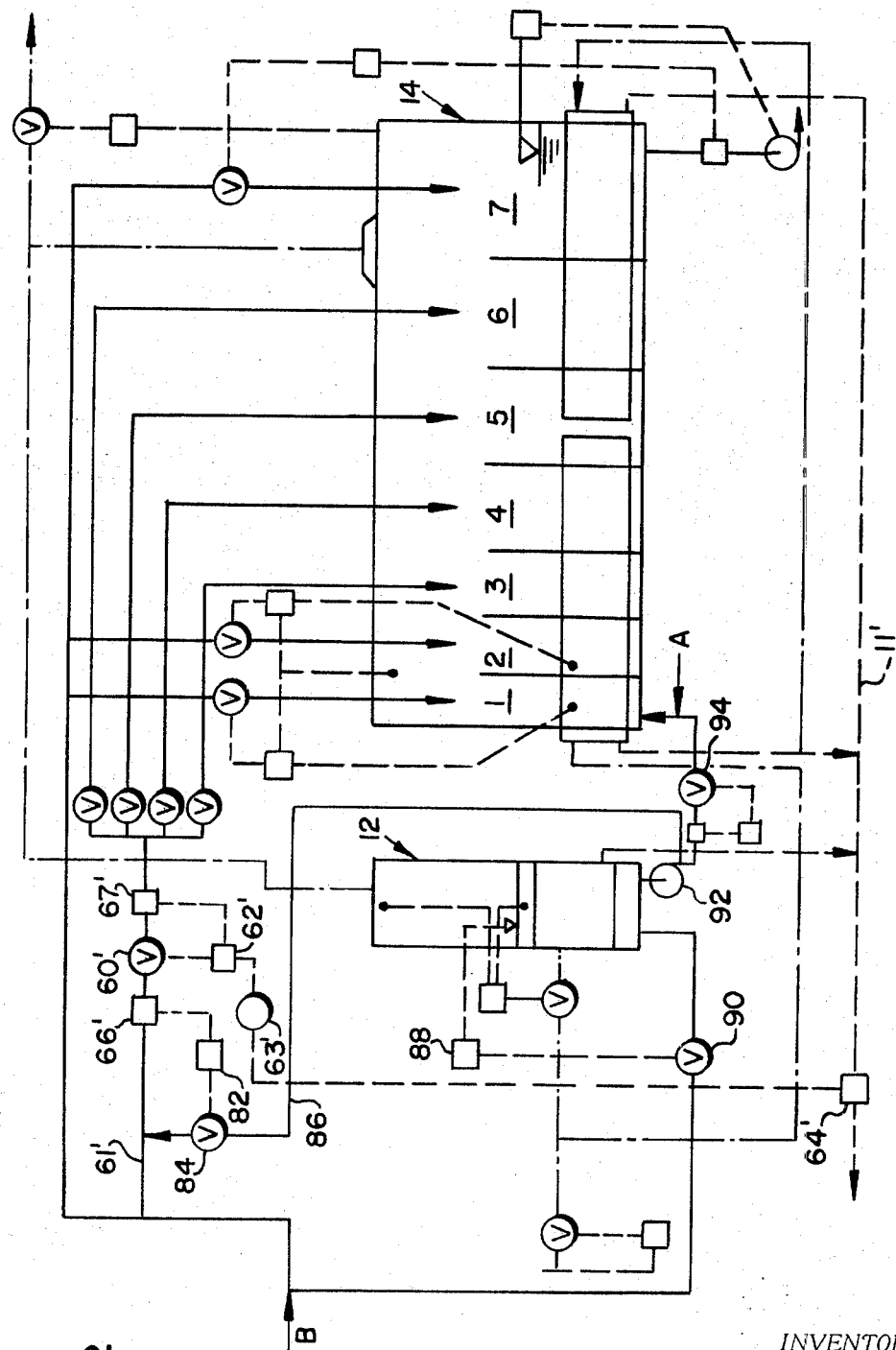

The above and other objects, advantages and features of the invention will be more fully understood by reference to the following detailed description of two now preferred embodiments thereof, taken in conjunction with the accompanying drawing wherein FIG. 1 is a schematic diagram illustrating an installation and control system according to the present invention; and FIG. 2 is a similar diagram showing another embodiment.

To avoid redundancy in the description, the same reference numerals designate like parts operating in an equivalent manner in both figures of the drawing.

Referring now to the drawing and first to FIG. 1, there is shown an installation for the continuous crystallization of sugar from sugar-containing juice, i.e. an aqueous solution or dispersion of sugar, which comprises essentially a horizontally disposed cylindrical tank 14 subdivided by partition walls 18 into seven crystallization cells or compartments 1 to 7, any suitable number of crystallization cells being usable, of course, and the illustrated installation including a first cell 1, an immediately successive cell 2, intermediate cells 3 to 6, and last cell 7, a separate concentrating vessel 12 being arranged upstream of the first cell 1. The concentrating vessel is a conventional evaporator.

Steam heated radiator means 20, shown to consist of two radiators, is provided for heating the cells, the radiators passing through the dividing walls, each to be common to a plurality of cells.

The control for the installation comprises a control for the vapor pressure in concentrating vessel 12 and crystallizing tank 14, a control for the vapor input into the radiators of the concentrating vessel and the crystallizing tank, and controls for the supply of undersaturated or dilute solutions to the concentrating vessel and the crystallizing cells in the tank.

The vapor pressure control 28 operates control valve 30 in the conduit 8 interconnecting the concentrating vessel 12 and the crystallizing tank 14 with the condensed to maintain a vapor pressure of a desired value in the concentrating vessel and the crystallizing tank.

A control 38 operates the control valve 36 in the main 9 delivering vapor to the radiators in the concentrating vessel and in the crystallizing tank to hold the amount of vapor delivered to the installation equal to a predetermined control value.

The control means for regulating the input of vapor to concentrating vessel 12 includes a control element 32 operating control valve 34 in the vapor conduit 9a to maintain the sugar concentration in the syrup at the outlet of the concentrating vessel equal to a set control value. For this purpose, thermometer probes 33 and 35 are placed in the concentrating vessel 12 to measure the boiling temperature of the syrup and the vapor temperature in the calender of the concentrating vessel, respectively, the measured values being fed to the control 32 which so controls the vapor supply through valve 34 that the difference between the two temperatures is held to an assigned control value.

The input of undersaturated solution supplied to the first cells 1 and 2 is controlled by control valves 44 and 46 in the supply conduits 10a, 10b for these two cells. These valves are respectively operated by controls 40 and 42 to maintain the supersaturation of the syrup in these first two cells equal to a predetermined control value. Thermometer probes 45 and 47 in the cells 1 and 2 measure the boiling temperature of the syrup therein, and a thermometer probe 48 measures the vapor temperature of the evaporated solvent liquid rising from the two cells. The difference between these two temperatures, i.e. the boiling temperature of the syrup and the temperature of the boiled-off syrup liquid, is a function of the concentration and, therefore, the supersaturation of the syrup.

The input of undersaturated solution supplied to the concentrating vessel 12 and the intermediate cells 3 to 6 of the crystallizing tank is regulated by control valve 60 in the supply conduit 61 of undersaturated solution. This control valve is operated by control 62 which maintains this total input equal to a control value J' delivered by a computer 63 as a function of the total amount Q' of condensed water coming from the radiators of the concentrating vessel and the crystallizing tank, this amount being measured by a flowmeter 64 in the water output conduits 11, 11a, 11b of the radiators, and a function of the sugar content (Brix degree) of the undersaturated sugar juice which is measured by hydrometer 66, the measurement signals from flowmeter 64 and hydrometer 66 being fed to computer 63 whose output is fed to control 62.

The control value J' delivered by the computer is derived from the following equation:

$$J' = Q' \frac{K}{1 - \frac{Bé.}{K'}}$$

wherein K is a constant, Bé. is the Brix degree of the undersaturated sugar juice supplied to the installation at B, and K' is the constant function of the Brix degree of the massecuite removed from the last cell.

This equation reflects the fact that the differences between the concentrations in sugar or other dry matter in the undersaturated sugar juice fed to the installation and the massecuite removed from the last cell are due solely to the evaporation of liquid solvent from the juice in the concentrating vessel and the crystallizing cells. The quantity of the water evaporated from the juice is, in effect, equal to the quantity of water condensed in the radiators. The constant K and K' have been introduced into the equation to take account of the fact that the total input of undersaturated solution introduced into the installation is not considered.

The control 62 compares the control value derived from the computer to the input value measured in input conduit 61 by flowmeter 67. If there is a difference between the control value and the measured value, the control operates control valve 60 downstream of flowmeter 67 to equalize the two values, i.e. to eliminate the detected difference therebetween.

Distributing valves 68 are mounted in branch conduits 61a, 61b, 61c, 61d and 61e of input main 61 to distribute the total input J of undersaturated solution conveniently to the concentrating vessel 12 and to the intermediate crystallizing cells 3 to 6, respectively.

The input of undersaturated solution to last cell 7 of the crystallizing tank is controlled separately by control valve 54 in input conduit 10 which is operated by control 56 to maintain the Brix degree of the massecuite removed from the last cell constant. Hydrometer 58 in the output conduit 13 delivers to control 56 a measurement of the density of the massecuite which is a function of the Brix degree thereof. The control operates the supply valve 54 so that the Brix degree is returned to the assigned control value whenever it departs therefrom. It would also be possible, of course, to regulate the input to cell 7 as a function of the percentage of crystals in the massecuite removed from the last cell.

The level of the sugar juice being crystallized in crystallizing tank 14 is sensed by a control 76 which operates a pump 78 in the output conduit 13 removing the massecuite through this conduit at a rate controlled to maintain the sugar juice level constant in the crystallizing tank.

The installation operates as follows, as will be understood from the above description of its functioning parts:

Undersaturated or dilute sugar juice is delivered to the installation at B whence a fraction of the juice to be crystallized is directed through input conduit 61 and branch conduit 61e into concentrating vessel 12 where part of its water is evaporated so as to concentrate the juice to a desired extent.

The concentrated aqueous sugar solution is delivered to the first cell 1 of the crystallizing tank through conduit 15 connecting the concentrating vessel with the crystallizing tank. At the same time, seed crystals derived from a magma are introduced into conduit 15 at A.

The mixture of concentrated juice and crystals passes through the crystallizing tank from cell to cell, undersaturated or dilute sugar juice being added to the mixture in each cell in a controlled manner, and the massecuite being finally removed from the last cell 7 by pump 78.

The flow rate or input of undersaturated juice supplied to first cell 1 is regulated by control 40 operating control valve 44 in input branch conduit 10a so as to maintain the supersaturation of the solution in this cell at a desired value. In the same manner, the flow rate or input of undersaturated juice supplied to immediately adjacent cell 2 is regulated by control 42 in input branch conduit 10b so as to maintain the supersaturation of the solution in the latter cell at a control value.

The total input J of undersaturated juice supplied to concentrating vessel 12 and to intermediate cells 3 to 6 through input main 61 is regulated by control valve 60 operated by control 62 which maintains this total input equal to the control value J' defined hereinabove, as computed by computer 63. This flow rate or input regulation so controls the Brix degree of the product leaving the last intermediate cell 6 that it varies only slightly with variations in the Brix degree of the supplied juice. In this manner, it is possible to maintain the Brix degree of the massecuite removed from the crystallizing tank constant and to assure correct operation of the installation by controlling the flow rate or input of undersaturated solution supplied to last cell 7 by means of control 56.

The flow rate or input of undersaturated solution to the concentrating vessel may be regulated independently of that of intermediate cells 3 to 6, as a function of Q and Bé., or it may be maintained constant by means of a flowmeter control.

The flow rate or input Q of vapor supplied to the radiators of the concentrating vessel and the crystallizing tank supplied through vapor main 9 and branch conduits 9a and 9b, respectively, is maintained constant by control 38, which means that the output Q' of condensed water from the radiators through water output main 11 and branch conduits 11a and 11b also is constant. It is, however, preferred to deliver to the computer 63 the real value of this output, and not its control value, in case this output accidentally falls below the control value.

The modified installation of FIG. 2 operates with like parts in a like manner, except where otherwise described and illustrated.

In this embodiment, the Brix degree of the undersaturated solution supplied to intermediate cells 3 to 6 is maintained constant and equal to a control value by means of a control 82 operating the control valve 84 in the input conduit 86 which connects the output of the concentrating vessel 12 to the input main 61' upstream of flowmeter 67'. The computer 63', which produces the control value for control 62' merely receives the output signal of flowmeter 64' in the output main 11' receiving the condensed water from the radiators in the installation.

As in the embodiment of FIG. 1, the Brix degree of the massecuite leaving the crystallizing tank is maintained constant, and the equation $$\frac{J}{Q} = \frac{K'}{1 - \frac{Bé.}{K'}}$$

becomes $$\frac{J}{Q} = K'', \text{ where } K'' \text{ is a constant}$$

because the Brix degree Bé., of thte undersaturated sugar juice and the Brix degree of the removed massecuite are constant. Thus, the total input J of juice supplied to intermediate cells 3 to 6 is proportional to the input Q of vapor to the radiators.

A control 88 operates control valve 90 in the input main supplying sugar juice to the concentrating vessel to set the level of juice in this vessel.

The flow rate or input of concentrated juice supplied to first cell 1 is maintained proportional to the input Q of vapor by a control 92 operating control valve 94.

The operation of the last-described embodiment will be obvious from the description of its functioning parts, particularly since it differs from that of the embodiment of FIG. 1 only in a relatively minor manner.

As in FIG. 1, the control system supplying the crystallizing cells 1 to 6 with undersaturated sugar juice permits the Brix degree of the massecuite supplied to last cell 7 to be maintained substantially constant, and the control 56 may accordingly readily maintain the Brix degree of the massecuite removed from the installation to be held to the desired value.

The flow rate or input of undersaturated juice supplied to first cells 1 and 2 may also be controlled as a function of Q and Bé. as is the input to intermediate cells 3 to 6, i.e. it may be proportional to the control value J'. In all cases, use may be made solely of the vapor input to the radiators in the crystallizing tank to control the juice input into intermediate cells 3 to 6 and, if desired, first cells 1 and 2 as well as the concentrating vessel.

Also, instead of measuring the output of condensed water from the radiators by flowmeters 64 and 64', it would be equally possible to measure the input of vapor to the radiators or the amount of evaporated water in the concentrating vessel and the crystallizing tank, all of these values being equivalent.

In the system of FIG. 2, the computer 63' may be operatively connected to the control 82 or to hydrometer 66' to avoid the manual introduction of the control value for the Brix degree of the juice input.

It will be obvious from the above description that many variations and modifications may be made in the installations while using the controls of the present invention as defined in the appended claims.

We claim:

1. A method of controlling a crystallization installation wherein the solute in a solution thereof with a liquid solvent is crystallized by evaporation of the liquid solvent in a continuous operation, the installation including a plurality of successive crystallization cells consisting of a first cell, a last cell and intermediate cells therebetween, steam heated radiator means for heating each of said cells, a concentrating vessel positioned upstream of the first cell, and a steam heated radiator means for heating the concentrating vessel, and comprising the steps of supplying a solution to be crystallized to the first cell, passing the solution successively from the first cell through the intermediate cells and to the last cell wherefrom the crystallized solute is removed, and supplying an undersaturated solution of the solute to the cells, wherein the improvement comprises (1) controlling the input of the undersaturated solution supplied to the last cell so as to maintain a constant concentration of the crystallized solute in the last cell, and (2) maintaining the total input of the undersaturated solution supplied to the intermediate cells at a control value which is a function of the heating vapor consumed in the cells and the concentration of the undersaturated solution entering the installation whereby the concentration of the crystallized solute removed from the last cell is determined.

2. The method of claim 1, wherein the undersaturated solution is supplied also to the concentrating vessel, and the input of the undersaturated solution into the concentrating vessel is also controlled so as to maintain the constant concentration of the crystallized solute in the last cell, the total input of the undersaturated solution maintained at said control value including that introduced into the concentrating vessel.

3. The method of claim 1, wherein the input of the undersaturated solution supplied to the first cell is maintained proportional to the control value.

4. The method of claim 3, wherein the input of the first cell and immediately successive ones of the intermediate cells is maintained proportional to the control value.

5. The method of claim 1, wherein the input of the solution supplied to the first cell is proportional to the total input of heating vapor consumed in the cells.

6. The method of claim 5, wherein the total input of heating vapor includes that consumed in the concentrating vessel.

7. The method of claim 1, wherein the concentration of the undersaturated solution entering the installation is maintained constant, and the total input of the undersaturated solution introduced into the intermediate cells is maintained proportional to the total output of the vapor consumed in the intermediate cells.

8. The method claim 7, wherein the undersaturated solution is supplied also to the concentrating vessel, the total input of the undersaturated solution including that introduced into the concentrating vessel and the total output of the vapor including that consumed in the concentrating vessel.

9. The method of claim 8, wherein the concentration of the undersaturated solution entering the installation is maintained constant by admixing to the solution a fraction of the concentrated solution leaving the concentrating vessel.

10. A control system for a crystallization installation in which the solute in a solution thereof with a liquid solvent is crystallized by evaporation of the liquid solvent in a continuous operation, comprising a plurality of successive crystallization cells including a first cell, a last cell and intermediate cells therebetween, a concentrating vessel positioned upstream of the first cell, inlet means for supplying a solution to be crystallized to the first cell, outlet means for removing the crystallized solute from the last cell, means interconnecting the cells for passing the solution to be crystallized successively from the first cell through the intermediate cells and to the last cell, steam heated radiator means for heating each of the cells and the concentrating vessel, and means for supplying an undersaturated solution of the solute to the cells, wherein the improvement includes (1) a first control means for controlling the supply of the undersaturated solution to the last cell in response to the concentration of the crystallized solute removed from the last cell;

(2) a first measuring means for measuring the concentration of the undersaturated solution supplied to the cells and producing a first measurement signal;

(3) a second measuring means for measuring the total amount of water condensed in the radiator means at least in the cells and producing a second measurement signal;

(4) a computer means receiving the measurement signals and producing a control signal which is a function of the measurement signals,
   (a) the control signal controlling the means for supplying the undersaturated solution to the intermediate cells; and (5) a second control means for controlling the total supply of the undersaturated solution in response to the control signal.

11. The control system of claim 10, further comprising means for supplying the undersaturated solution also to the concentrating vessel, and wherein the control signal also controls the latter supply means.

12. The control system of claim 11, further comprising a third control means operatively connected to the first measuring means, and a means for supplying a concentrated solution to the undersaturated solution upstream of the third control means, the third control means so controlling the concentrated solution supply that the concentration of the undersaturated solution supplied to the intermediate cells remains constant.

13. The control system of claim 12, wherein the third control means also controls the supply of the concentrated solution to the concentrating vessel.

14. The control system of claim 12, wherein the concentrating vessel has an outlet means, the undersaturated solution supply means comprising a conduit means, a conduit interconnects the outlet means of the concentrating vessel with the conduit means, a control valve means is positioned in the interconnecting conduit, the third control means controls the control valve means, another conduit interconnects the outlet means of the concentrating vessel to the first cell, another control valve means is positioned in the other interconnecting conduit, and a fourth control means controls the other control valve means for maintaining the throughput in the other interconnecting conduit proportional to the total amount of condensed water in the radiator means in the cells.

15. The control system of claim 14, wherein the total amount of condensed water includes that in the radiator means in the concentrating vessel.

References Cited
UNITED STATES PATENTS

| | | | |
|---|---|---|---|
| 3,424,221 | 1/1969 | Luce | 127—16 X |
| 3,497,449 | 2/1970 | Urban | 23—230 A |
| 3,554,800 | 1/1971 | Javet | 127—16 |
| 3,556,845 | 1/1971 | Dambrine | 127—16 |

MORRIS O. WOLK, Primary Examiner

S. MARANTZ, Assistant Examiner

U.S. Cl. X.R.

23—273 R, 295 230 A, 253 A; 127—15, 58; 235—151.12